US010785349B2

(12) United States Patent
Jia

(10) Patent No.: US 10,785,349 B2
(45) Date of Patent: Sep. 22, 2020

(54) METHOD FOR NEGOTIATING MAXIMUM PACKAGING INTERVAL, APPARATUS, AND STORAGE MEDIUM

(71) Applicant: Huawei Technologies Co., Ltd., Shenzhen (CN)

(72) Inventor: Yinyuan Jia, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 46 days.

(21) Appl. No.: 16/320,857

(22) PCT Filed: Jul. 27, 2016

(86) PCT No.: PCT/CN2016/091959
§ 371 (c)(1),
(2) Date: Jan. 25, 2019

(87) PCT Pub. No.: WO2018/018475
PCT Pub. Date: Feb. 1, 2018

(65) Prior Publication Data
US 2019/0166233 A1 May 30, 2019

(51) Int. Cl.
G06F 15/16 (2006.01)
H04L 29/06 (2006.01)
(Continued)

(52) U.S. Cl.
CPC ............ *H04L 69/24* (2013.01); *H04L 65/105* (2013.01); *H04L 65/1013* (2013.01);
(Continued)

(58) Field of Classification Search
CPC . H04L 69/24; H04L 65/1013; H04L 65/1016; H04L 65/1023; H04L 65/105;
(Continued)

(56) References Cited

U.S. PATENT DOCUMENTS 10,212,755 B1 * 2/2019 Pawar ................... H04W 76/28
2007/0230394 A1 10/2007 Wang et al.
(Continued)

FOREIGN PATENT DOCUMENTS

CN 101330700 A 12/2008
CN 101873537 A 10/2010
(Continued)

OTHER PUBLICATIONS

Machine Translation and Abstract of Chinese Publication No. CN101330700, Dec. 24, 2008, 10 pages.
(Continued)

Primary Examiner — Imad Hussain
(74) Attorney, Agent, or Firm — Conley Rose, P.C.

(57) ABSTRACT

A method for negotiating a maximum packaging interval, an apparatus, and a storage medium related to the field of communications technologies. The method includes obtaining, by a voice over long term evolution (VoLTE) apparatus, Connected Mode Discontinuous Reception (CDRX) period configuration information of a base station, determining a maximum packaging interval of downlink data based on the CDRX period configuration information, and sending the maximum packaging interval to an Internet Protocol (IP) multimedia core network subsystem (IMS) core network. Hence, the method can resolve a problem of high power consumption caused by that the VoLTE apparatus is frequently woken up within a CDRX period.

20 Claims, 5 Drawing Sheets

(51) Int. Cl.
  *H04W 76/28* (2018.01)
  *H04W 4/06* (2009.01)
(52) U.S. Cl.
  CPC ...... *H04L 65/1016* (2013.01); *H04L 65/1023* (2013.01); *H04W 4/06* (2013.01); *H04W 76/28* (2018.02); *Y02D 70/1262* (2018.01); *Y02D 70/1264* (2018.01)
(58) Field of Classification Search
  CPC .... H04W 76/28; H04W 4/06; Y02D 70/1262; Y02D 70/1264
  USPC ......................................................... 709/227
  See application file for complete search history.

(56) References Cited

U.S. PATENT DOCUMENTS

| | | | |
|---|---|---|---|
| 2013/0265987 A1* | 10/2013 | Ramachandran | ........................... H04W 36/0033 370/331 |
| 2014/0219151 A1* | 8/2014 | Damji | ............... H04W 52/0235 370/311 |
| 2014/0301272 A1* | 10/2014 | Vajapeyam | ........... H04W 84/02 370/328 |
| 2015/0092645 A1* | 4/2015 | Tabet | .................... H04L 1/1864 370/311 |
| 2015/0124671 A1* | 5/2015 | Tabet | ................ H04W 52/0251 370/311 |
| 2015/0124699 A1 | 5/2015 | Chebolu et al. | |
| 2015/0201454 A1 | 7/2015 | Shukair et al. | |
| 2015/0237580 A1* | 8/2015 | Yu | ..................... H04W 52/0251 370/311 |
| 2015/0282030 A1* | 10/2015 | Vrind | ................ H04W 36/0061 370/311 |
| 2015/0373774 A1* | 12/2015 | Belghoul | ............ H04L 43/0858 370/252 |
| 2016/0073284 A1* | 3/2016 | Qian | ................. H04W 52/0251 370/241 |
| 2016/0157178 A1* | 6/2016 | Koc | ......... H04L 67/10 455/574 |
| 2016/0219518 A1* | 7/2016 | Zhao | ................ H04W 52/0274 |
| 2016/0269996 A1 | 9/2016 | Wu et al. | |
| 2016/0286599 A1* | 9/2016 | Weingertner | ..... H04W 52/0216 |
| 2017/0019919 A1* | 1/2017 | Liang | .................... H04W 72/04 |
| 2017/0150386 A1* | 5/2017 | Hoover | ................. H04W 76/28 |
| 2017/0171817 A1* | 6/2017 | Zhao | .................... H04W 72/048 |
| 2017/0180085 A1* | 6/2017 | Balasubramanian | ........................ H04W 52/0235 |
| 2017/0359780 A1* | 12/2017 | Ji | ........................... H04W 76/28 |
| 2018/0070404 A1* | 3/2018 | Giguet | .............. H04W 52/0216 |

FOREIGN PATENT DOCUMENTS

| | | |
|---|---|---|
| CN | 103152802 A | 6/2013 |
| CN | 104159254 A | 11/2014 |
| CN | 104602328 A | 5/2015 |
| CN | 104811919 A | 7/2015 |
| EP | 3026964 A1 | 6/2016 |

OTHER PUBLICATIONS

Machine Translation and Abstract of Chinese Publication No. CN101873537, Oct. 27, 2010, 28 pages.
Machine Translation and Abstract of Chinese Publication No. CN104159254, Nov. 19, 2014, 21 pages.
"Series H: Audiovisual and Multimedia Systems, Infrastructure of audiovisual services—Transmission multiplexing and synchronization, Call signalling protocols and media stream packetization for packet-based multimedia communication systems, Amendment 1: Use of the Facility message to enable call transfer," ITU-T H.225.0, Mar. 2013, 8 pages.
"Series H: Audiovisual and Multimedia Systems, Infrastructure of audiovisual services—Systems and terminal equipment for audiovisual services, Packet-based multimedia communications systems, Amendment 1: Use of Facility message to enable call transfer," ITU-T H.323, Mar. 2013, 8 pages.
"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321, V13.2.0, Jun. 2016, 91 pages.
GSMA "IMS Profile for Voice and SMS," Version 9.0, Apr. 8, 2015, 40 pages.
Schulzrinne, H., et al, "RTP: A Transport Protocol for Real-Time Applications," RFC 1889, Jan. 1996, 75 pages.
Schulzrinne, H., et al. "RTP Profile for Audio and Video Conferences with Minimal Control," RFC 1890, Jan. 1996, 18 pages.
Schulzrinne, H., et al, "RTP: A Transport Protocol for Real-Time Applications," RFC 3550, Jul. 2003, 89 pages.
Schulzrinne, H., et al. "RTP Profile for Audio and Video Conferences with Minimal Control," RFC 3551, Jul. 2003, 38 pages.
Foreign Communication From a Counterpart Application, PCT Application No. PCT/CN2016/091959, English Translation of International Search Report dated Apr. 6, 2017, 2 pages.
Foreign Communication From a Counterpart Application, PCT Application No. PCT/CN2016/091959, English Translation of Written Opinion dated Apr. 6, 2017, 4 pages.
Rosenberg, J., et al., "SIP: Session Initiation Protocol," RFC 3261, Jun. 2002, 269 pages.
Rosenberg, J., "SIP: Session Initiation Protocol," RFC 2543, XP015009039, Mar. 1999, 153 pages.
"3rd Generation Partnership Project; Technical Specification Group Services and System Aspects; IP Multimedia Subsystem (IMS); Stage 2 (Release 13)," XP050996015, 3GPP TS 23.228, V13.4.0, Sep. 2015, 314 pages.
Foreign Communication From a Counterpart Application, European Application No. 16910056.7, European Office Action dated Dec. 17, 2019, 10 pages.
Sjoberg, J., et al.,"RTP Payload Format and File Storage Format for the Adaptive Multi-Rate (AMR) and Adaptive Multi-Rate Wideband (AMR-WB) Audio Codecs," XP015050698, RFC 4867, 59 pages.
Qualcomm Inc, et al.,"UE Preferred C-DRX Cycle Reporting for VoLTE," XP051104853, R2-164195, 3GPP TSG-RAN WG2 Meeting #94, Nanjing, China, May 23-27, 2016, 6 pages.
"3rd Generation Partnership Project; Technical Specification Group Services and System Aspects; IP Multimedia Subsystem (IMS); Multimedia Telephony; Media handling and interaction (Release 14)," XP051123230, 3GPP TS 26.114, V14.0.0, part 1, Jun. 2016, pp. 1-183.
"3rd Generation Partnership Project; Technical Specification Group Services and System Aspects; IP Multimedia Subsystem (IMS); Multimedia Telephony; Media handling and interaction (Release 14)," XP051123230, 3GPP TS 26.114, V14.0.0, part 1, Jun. 2016, pp. 184-366.
Foreign Communication From a Counterpart Application, PCT Application No. PCT/CN2016095052, English Translation of International Search Report dated Apr. 12, 2017, 2 pages.

* cited by examiner

METHOD FOR NEGOTIATING MAXIMUM PACKAGING INTERVAL, APPARATUS, AND STORAGE MEDIUM

CROSS-REFERENCE TO RELATED APPLICATIONS

This application is a U.S. National Stage of International Patent Application No. PCT/CN2016/091959 filed on Jul. 27, 2016, which id hereby incorporated by reference in its entirety.

TECHNICAL FIELD

The present invention relates to the field of communications technologies, and in particular, to a method for negotiating a maximum packaging interval, an apparatus, and a storage medium.

BACKGROUND

In a communications network, when a circuit switched (Circuit Switched, CS) apparatus performs voice communication with a voice service (Voice over LTE, VoLTE) apparatus based on a Long Term Evolution (Long Term Evolution, LTE) technology, voice data is sent to a peer end after the voice data is converted by using an Internet Protocol (Internet Protocol, IP) multimedia media gateway (IP Multimedia Media Gateway, IM-MGW) apparatus. The CS apparatus is an apparatus using a $2^{nd}$ generation wireless telephone technology (2-Generation Wireless Telephone Technology, 2G)/a $3^{rd}$ generation wireless telephone technology (3rd-Generation Wireless Telephone Technology, 3G)/a CS technology of a public switched telephone network (Public Switched Telephone Network, PSTN), and includes an apparatus using a circuit switched fallback (Circuit Switched Fallback, CSFB) technology that is applied to a scenario in which a 2G/3G circuit switched domain overlaps and covers a Time Division Long Term Evolution (Time Division Long Term Evolution, TD-LTE) wireless network. The VoLTE apparatus is an apparatus supporting a VoLTE function in an LTE network of a 4th generation mobile communication technology (The 4th Generation Mobile Communication, 4G).

Before voice data sent by the CS apparatus is converted, a maximum packaging interval (maxptime) needs to be negotiated in advance for downlink data sent to the VoLTE apparatus, so that the IM-MGW apparatus may package, based on the negotiated maximum packaging interval, the voice data sent by the CS apparatus to the VoLTE apparatus.

To reduce power consumption, a connected mode discontinuous reception (Connected Mode Discontinuous Reception, CDRX) function is introduced to a VoLTE network. Based on the function, the VoLTE apparatus may enter a sleep period having duration of a CDRX period at a connected mode data transmission stage and in a data packet interval, thereby reducing power consumption.

A data packet received by the VoLTE apparatus is a data packet encapsulated by the IM-MGW apparatus based on the maximum packaging interval, but the CDRX period is configured by a base station of an LTE network side. In this case, a relationship between values of the maximum packaging interval and the CDRX period is usually improper, that is, a relationship between values of the data packet interval and the CDRX period is improper. Consequently, the VoLTE apparatus is frequently woken up within the CDRX period to perform data processing, increasing power consumption of the VoLTE apparatus.

SUMMARY

Embodiments of the present invention provide a method for negotiating a maximum packaging interval, an apparatus, and a storage medium, to resolve a prior-art problem of high power consumption that is caused by that when a VoLTE apparatus performs voice communication with a CS apparatus, the VoLTE apparatus is frequently woken up within a CDRX period because a maximum packaging interval does not match the CDRX period.

The following technical solutions are used in the embodiments of the present invention to achieve the foregoing objective.

According to a first aspect, an embodiment of the present invention provides a method for negotiating a maximum packaging interval, where the method is applied to a VoLTE apparatus. The method includes: First, the VoLTE apparatus obtains CDRX period configuration information of a base station. Then, the VoLTE apparatus configures a maximum packaging interval maxptime of downlink data based on the CDRX period configuration information. The maximum packaging interval maxptime is greater than or equal to a CDRX period and is less than or equal to maximum data packet duration supported by the VoLTE apparatus, and the maximum packaging interval maxptime is a positive integer multiple of a packaging interval ptime. Then, the VoLTE apparatus sends the maximum packaging interval maxptime to a PCSCF apparatus in an IMS core network.

In this way, the maximum packaging interval maxptime that is configured by the VoLTE apparatus based on the CDRX period and that is of the downlink data forwarded by the PCSCF apparatus to an IM-MGW apparatus may be greater than or equal to the CDRX period, to avoid the problem of high power consumption that is caused by that the VoLTE apparatus is frequently woken up within the CDRX period because the maximum packaging interval maxptime is less than the CDRX period, that is, a data packet interval at a connected mode data transmission stage is less than the CDRX period.

In a possible design, the maximum packaging interval maxptime is a value that is among positive integer multiples of the packaging interval ptime and that has a minimum difference from the CDRX period, so that the maximum packaging interval maxptime is a smallest value under a premise that the maximum packaging interval maxptime is greater than or equal to the CDRX period, to minimize a quantity of data frames in a data packet based on reducing power consumption of the VoLTE apparatus, thereby reducing a volume of lost data when a packet loss rate is unchanged.

In a possible design, based on that the maximum packaging interval maxptime is greater than or equal to the CDRX period and is less than or equal to the maximum data packet duration supported by the VoLTE apparatus, and the maximum packaging interval maxptime is the positive integer multiple of the packaging interval ptime, the maximum packaging interval maxptime is less than or equal to a preset threshold, and the preset threshold is less than or equal to the maximum data packet duration supported by the VoLTE apparatus.

In this case, because the preset threshold is less than or equal to the maximum data packet duration supported by the VoLTE apparatus, the value of the maximum packaging interval maxptime less than or equal to the preset threshold is relatively small, and a quantity of data frames in a data packet packaged based on the maximum packaging interval maxptime is relatively small. When the packet loss rate is unchanged, a volume of lost data is also relatively small, so that de-jitter performance of a voice packet may be improved, and voice quality is improved.

In a possible design, when determining, based on the CDRX period configuration information, that the CDRX period is not configured, the VoLTE apparatus configures the maximum packaging interval maxptime to be a preset value. The preset value is less than or equal to the maximum data packet duration supported by the VoLTE apparatus, and is the positive integer multiple of the packaging interval ptime.

In this case, because the preset value is less than or equal to the maximum data packet duration supported by the VoLTE apparatus, when the maximum packaging interval maxptime is configured to be the preset value, duration of the data packet packaged based on the maximum packaging interval maxptime may be within a range within which the VoLTE apparatus may perform processing. Moreover, when the preset value is less than or equal to the maximum data packet duration supported by the VoLTE apparatus, the maximum packaging interval maxptime is set to the preset value, the value of the maximum packaging interval maxptime may be relatively small, so that the quantity of the data frames in the data packet packaged based on the maximum packaging interval maxptime is relatively small. Therefore, the volume of lost data may be appropriately reduced when the packet loss rate is unchanged.

In a possible design, the method further includes: After receiving a CDRX period configuration information obtaining request sent by the VoLTE apparatus, the base station sends the CDRX period configuration information to the VoLTE apparatus, so that the VoLTE apparatus configures the maximum packaging interval maxptime based on the CDRX period in the configuration information.

According to a second aspect, an embodiment of the present invention provides a method for negotiating a maximum packaging interval, applied to a proxy call session control function PCSCF apparatus in an Internet Protocol IP multimedia subsystem IMS core network, and including: receiving, by the PCSCF apparatus, a maximum packaging interval maxptime sent by a VoLTE apparatus, where the maximum packaging interval maxptime is greater than or equal to a CDRX period of the VoLTE apparatus and is less than or equal to maximum data packet duration supported by the VoLTE apparatus, and the maximum packaging interval maxptime is a positive integer multiple of a packaging interval ptime; and sending the maximum packaging interval maxptime to an Internet Protocol IP multimedia gateway IM-MGW apparatus.

According to a third aspect, an embodiment of the present invention provides a method for negotiating a maximum packaging interval, applied to an Internet Protocol IP multimedia gateway IM-MGW apparatus, and including: receiving, by the IM-MGW apparatus, a maximum packaging interval maxptime sent by a proxy call session control function PCSCF apparatus, where the maximum packaging interval maxptime is greater than or equal to a CDRX period of a VoLTE apparatus and is less than or equal to maximum data packet duration supported by the VoLTE apparatus, and the maximum packaging interval maxptime is a positive integer multiple of a packaging interval ptime; and packaging, based on the maximum packaging interval maxptime, voice data sent by a CS apparatus to the VoLTE apparatus.

According to a fourth aspect, an embodiment of the present invention provides an apparatus. The apparatus includes an obtaining unit, a configuring unit, and a sending unit. The obtaining unit is configured to obtain CDRX period configuration information of a base station. The configuring unit is configured to configure a maximum packaging interval maxptime of downlink data based on the CDRX period configuration information. The maximum packaging interval maxptime is greater than or equal to a CDRX period and is less than or equal to maximum data packet duration supported by a VoLTE apparatus, and the maximum packaging interval maxptime is a positive integer multiple of a packaging interval ptime. The sending unit is configured to send the maximum packaging interval maxptime to a proxy call session control function PCSCF apparatus in an Internet Protocol IP multimedia subsystem IMS core network. Based on a same inventive concept, for principles of resolving the problem by the apparatus and beneficial effects of the apparatus, refer to the first aspect, the possible implementations of the first aspect, and beneficial effects thereof. Therefore, for implementation of the apparatus, refer to implementation of the method. Repeated descriptions are not described again.

According to a fifth aspect, an embodiment of the present invention provides an apparatus. For principles of resolving the problem by the apparatus and beneficial effects of the apparatus, refer to the second aspect, the possible implementations of the second aspect, and beneficial effects thereof. Therefore, for implementation of the apparatus, refer to implementation of the method. Repeated descriptions are not described again.

According to a sixth aspect, an embodiment of the present invention provides an apparatus. For principles of resolving the problem by the apparatus and beneficial effects of the apparatus, refer to the third aspect, the possible implementations of the third aspect, and beneficial effects thereof. Therefore, for implementation of the apparatus, refer to implementation of the method. Repeated descriptions are not described again.

According to a seventh aspect, an embodiment of the present invention provides an apparatus. The apparatus includes a memory, a transceiver, and a processor. The processor is coupled to the memory and the transceiver. The memory is configured to store computer executable program code, the program code includes an instruction, and when the processor executes the instruction, the solution in the method designs of the first aspect is implemented. For implementations of resolving the problem by the apparatus and beneficial effects of the apparatus, refer to the first aspect, the possible implementations of the first aspect, and beneficial effects thereof. Therefore, for implementation of the apparatus, refer to implementation of the method. Repeated descriptions are not described again.

According to an eighth aspect, an embodiment of the present invention provides an apparatus. The apparatus includes a memory, a transceiver, and a processor. The processor is coupled to the memory and the transceiver. The memory is configured to store computer executable program code, the program code includes an instruction, and when the processor executes the instruction, the instruction instructs the apparatus to implement the solution in the method designs of the second aspect. For implementations of resolving the problem by the apparatus and beneficial effects of the apparatus, refer to the second aspect, the possible implementations of the second aspect, and beneficial effects thereof. Therefore, for implementation of the apparatus, refer to implementation of the method of the second aspect. Repeated descriptions are not described again.

According to a ninth aspect, an embodiment of the present invention provides an apparatus. The apparatus includes a memory, a transceiver, and a processor. The processor is coupled to the memory and the transceiver. The memory is configured to store computer executable program code, the program code includes an instruction, and when the processor executes the instruction, the instruction instructs the apparatus to implement the solution in the method designs of the third aspect. For implementations of resolving the problem by the apparatus and beneficial effects of the apparatus, refer to the third aspect, the possible implementations of the third aspect, and beneficial effects thereof. Therefore, for implementation of the apparatus, refer to implementation of the method of the third aspect. Repeated descriptions are not described again.

According to a tenth aspect, an embodiment of the present invention provides a computer storage medium, configured to store computer software instructions related to the solutions in the method designs of the first aspect to the third aspect.

According to an eleventh aspect, an embodiment of the present invention provides a communications system. The system includes the apparatus that may implement a function of a VoLTE apparatus, the apparatus that may implement a function of a PCSCF apparatus, and the apparatus that may implement a function of an IM-MGW apparatus, the base station, and the CS apparatus according to the foregoing aspects.

Compared with the prior art, in the solutions provided in the embodiments of the present invention, after receiving the CDRX period configuration information sent by the base station, when determining, based on the CDRX period configuration information, that the CDRX period is configured, the VoLTE apparatus configures, based on the CDRX period, the maximum packaging interval maxptime of the downlink data to be greater than or equal to the CDRX period, to avoid the problem of high power consumption that is caused by that the VoLTE apparatus is frequently woken up within the CDRX period because the maximum packaging interval maxptime is less than the CDRX period, that is, a data packet interval at a connected mode data transmission stage is less than the CDRX period.

To ease of understanding, examples of some concepts related to the present invention are described for reference. Descriptions are as follows:

VoLTE: It is a voice service based on an IP multimedia subsystem (IP Multimedia Subsystem, IMS). The VoLTE is an IP data transmission technology in which all services are carried on a 4G network without a 2G/3G network, so that data and a voice service may be unified in a same network.

Packaging interval ptime: It is duration of a data frame.

Discontinuous reception: It is a period of time in which listening on a physical downlink control channel (Physical Downlink Control Channel, PDCCH) is stopped.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
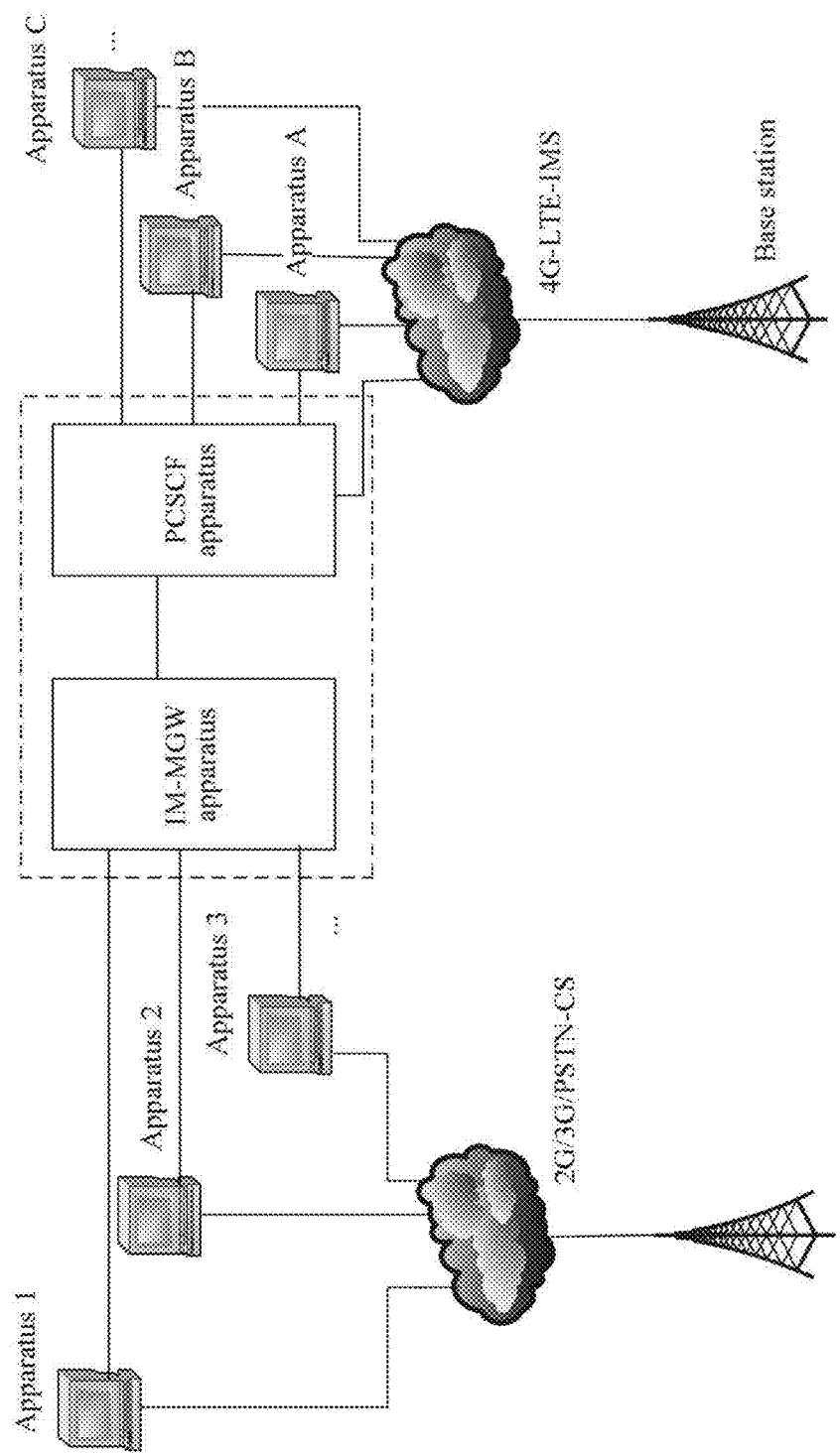
FIG. 1 is a schematic diagram of a basic network architecture according to an embodiment of the present invention.

For a schematic diagram of a basic network architecture for voice communication between a VoLTE apparatus and a CS apparatus, refer to FIG. 1. In the basic network architecture shown in FIG. 1, a CS apparatus based on a 2G/3G/PSTN network circuit switched domain may include a plurality of apparatuses, such as an apparatus 1, an apparatus 2, and an apparatus 3. A VoLTE apparatus based on an IMS network of a 4G LTE technology may include a plurality of apparatuses, such as an apparatus A, an apparatus B, and an apparatus C. The IMS network may further include a call session control (Call Session Control Function, CSCF) apparatus, such as a proxy call session control function (Proxy Call Session Control Function, PCSCF) apparatus, and is mainly used for processing signaling control in a multimedia call session process, management of user authentication of the IMS network, quality of service (Quality of Service, QoS) of an IMS bearer plane, control over a session based on a Session Initiation Protocol (Session Initiation Protocol, SIP) performed with another network entity, service negotiation, resource allocation, and the like. Because a data format used by the CS network is different from that used by the LTE network during the voice communication, when the apparatus 1, the apparatus 2, and the apparatus 3 in the CS apparatus perform the voice communication with the apparatus A, the apparatus B, and the apparatus C in the VoLTE apparatus, voice data needs to be converted by an IM-MGW apparatus, to convert the voice data sent by the CS apparatus into a data format needed by the VoLTE apparatus, thereby performing the voice communication with the VoLTE apparatus.

In the embodiments of the present invention, the VoLTE apparatus and the CS apparatus may be specifically terminal devices. It should be understood that, in the embodiments of the present invention, a terminal may be referred to as user equipment (User Equipment, UE), a mobile station (Mobile Station, MS), a mobile terminal (Mobile Terminal), a computer, a microcomputer, and the like. The terminal may communicate with one or more core networks through a radio access network (Radio Access Network, "RAN" for short). For example, the terminal may be a mobile phone (or referred to as a "cellular" phone) and a computer with a mobile terminal. For example, the terminal may alternatively be a portable, pocket-sized, handheld, computer built-in, or in-vehicle mobile apparatus, which exchanges voice and/or data with the radio access network. This is not limited in the present invention. For example, the terminal may further include a wired access terminal having a multi-carrier feature.

The IM-MGW apparatus in the architecture shown in FIG. 1 is mainly used for media stream interworking between an IMS and a PSTN/CS domain. The IM-MGW apparatus provides a user plane link between a CS core network and the IMS, and supports conversion of a time division multiplexing (Time Division Multiplexing, TDM) bearer of the PSTN/circuit domain and an IP bearer of an IMS user plane (that is, codec conversion between an IP media stream and a pulse code modulation (Pulse Code Modulation, PCM) media stream). When an IMS terminal does not support a CS end in encoding, the IM-MGW apparatus implements the codec conversion. The IM-MGW apparatus may alternatively implement call connection under control by a media gateway control function (Media Gateway Control Function, MGCF) apparatus.

The IM-MGW apparatus may further terminate a bearer channel of a circuit switched network and a media stream from a packet-based network (for example, a Real-time Transport Protocol (Real-time Transport Protocol, RTP) stream in an IP network or an AAL2/ATM connection in an asynchronous transfer mode (Asynchronous Transfer Mode, ATM) backbone network), perform conversion between the terminals, and perform code conversion and signaling processing for the user plane as required.

The IM-MGW apparatus establishes/releases a bearer connection of two interworking sides and processes mapping based on a resource control command from the MGCF, and controls special resource processing of the user plane based on a resource control command from the MGCF. The special resource processing includes codec conversion of an audio, control over echo suppression, and the like.

In this embodiment of the present invention, when the IM-MGW apparatus performs voice communication with the VoLTE apparatus as the CS apparatus, the apparatus for converting the voice data may be, for example, a session border controller (Session Border Controller, SBC) apparatus. Specifically, when converting the voice data from the CS apparatus, the IM-MGW apparatus may perform Real-time Transport Protocol (Real-time Transport Protocol, RTP) packaging on the voice data based on the maximum packaging interval maxptime that is negotiated in advance, and send a packaged voice data packet to the VoLTE apparatus.

In the architecture shown in FIG. 1, the PCSCF apparatus is a unified entry point for accessing a network by the IMS. All session messages initiated from the IMS terminal and terminated on the IMS terminal need to pass through the PCSCF apparatus. As a SIP proxy, the PCSCF apparatus is responsible for user authentication related to an access network and Internet Protocol Security (Internet Protocol Security, IPSec) management, network anti-attack and security protection, SIP signaling compression and decompression for saving a radio network resource, roaming control for a user, and network address translation (Network Address Translation, NAT) and QoS on a bearer plane by using a policy decision function (Policy Decision Function, PDF). The PCSCF apparatus may be configured to: forward, to an interrogating call session control function (Interrogating CSCF, ICSCF), a SIP registration request sent by the terminal, where the ICSCF is determined based on a domain name provided by the terminal; and forward, to a severing call session control function (Serving CSCF, SCSCF), a SIP message sent by the terminal, where the SCSCF is determined by the PCSCF apparatus when the terminal initiates a registration procedure.

When a voice conversation is established, the VoLTE apparatus needs to negotiate a voice media attribute, such as the maximum packaging interval maxptime. The maximum packaging interval maxptime in the prior art usually has difficulty in keeping dynamically matching the CDRX period configured by a network side. Consequently, the VoLTE apparatus is easily frequently woken up to perform data transmission, resulting in an increase in power consumption of the VoLTE apparatus. In view of this problem, in this embodiment of the present invention, when the maximum packaging interval maxptime is negotiated, the VoLTE apparatus sets, based on the CDRX period configured by the network side, the maximum packaging interval maxptime greater than or equal to the CDRX period, so that the maximum packaging interval maxptime matches the CDRX, and forwards the packaging interval maxptime to the IM-MGW apparatus by using the PCSCF apparatus, so that the IM-MGW apparatus packages, based on the maximum packaging interval maxptime greater than or equal to the CDRX period, a voice data packet sent by the CS apparatus to the VoLTE apparatus, to avoid an increase in the power consumption resulted from that the VoLTE apparatus is frequently woken up.

Figure 2:
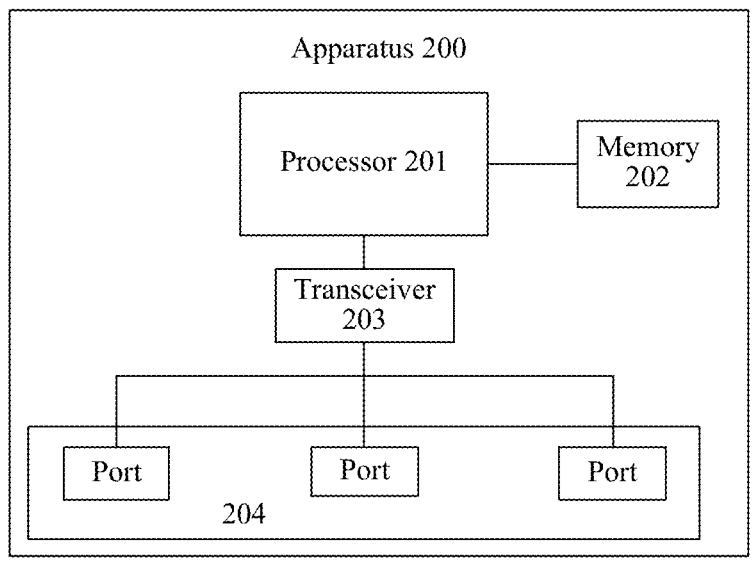
FIG. 2 is a schematic structural diagram of a VoLTE apparatus, a PCSCF apparatus, or an IM-MGW apparatus according to an embodiment of the present invention.

FIG. 2 is a schematic structural diagram of an apparatus 200 according to an embodiment of the present invention. The apparatus 200 may be applied to the system architecture shown in FIG. 1. The apparatus 200 may include one or more ports 204. The port 204 is coupled to a transceiver (Transceiver) 203. The transceiver 203 may be a transmitter, a receiver, or a combination of a transmitter and a receiver, and sends or receives a data packet to or from another network node by using the port 204. A processor 201 is coupled to the transceiver 203 and is configured to process the data packet. The processor 201 may include one or more multi-core processors and/or memories. The processor 201 may be a general purpose processor, an application-specific integrated circuit (application specific integrated circuit, ASIC), or a digital signal processor (DSP).

A memory 202 may be a non-transitory storage medium, is coupled to the processor 201, and is configured to store different types of data. The memory 202 may include a read-only memory (read only memory, ROM), a random access memory (random access memory, RAM), or a dynamic storage device that is of another type and that can store information and an instruction, or may be a magnetic disk memory. The memory 202 may be configured to store an instruction of a method related to resource operations. It may be understood that an executable instruction is programmed or loaded to at least one of the processor 201, a cache, or a long-term storage of the device 200.

The apparatus 200 may execute one or more instructions based on this embodiment of the present invention, to perform a resource operation method. The instructions may be stored in the memory 202, or may be integrated in a kernel of an operating system of the apparatus or in a plug-in of a kernel.

The structure shown in FIG. 2 may be used as a schematic diagram of a VoLTE apparatus according to an embodiment of the present invention. The apparatus 200 is used as the VoLTE apparatus, and may include a memory 202, a processor 201, a transceiver 203, and one or more ports 204 coupled to the transceiver. The memory 202 is configured to store computer executable program code. The processor 201 is coupled to the memory 202 and the transceiver 203. The program code includes an instruction. When the processor executes the instruction, the instruction causes the apparatus 200 to perform related steps performed by the VoLTE apparatus in FIG. 3 to FIG. 5.

In addition, the structure shown in FIG. 2 may alternatively be used as a schematic diagram of a PCSCF apparatus according to an embodiment of the present invention. The apparatus 200 is used as the PCSCF apparatus, and may include a memory 202, a processor 201, a transceiver 203, and one or more ports 204 coupled to the transceiver. The memory 202 is configured to store computer executable program code. The processor 201 is coupled to the memory 202 and the transceiver 203. The program code includes an instruction. When the processor executes the instruction, the instruction causes the apparatus 200 to perform related steps performed by the PCSCF apparatus in FIG. 3 to FIG. 5.

In addition, the structure shown in FIG. 2 may alternatively be used as a schematic diagram of an IM-MGW apparatus according to an embodiment of the present invention. The apparatus 200 is used as the IM-MGW apparatus, and may include a memory 202, a processor 201, a transceiver 203, and one or more ports 204 coupled to the transceiver. The memory 202 is configured to store computer executable program code. The processor 201 is coupled to the memory 202 and the transceiver 203. The program code includes an instruction. When the processor executes the instruction, the instruction causes the apparatus 200 to perform related steps performed by the IM-MGW apparatus in FIG. 3 to FIG. 5.

Figure 3:
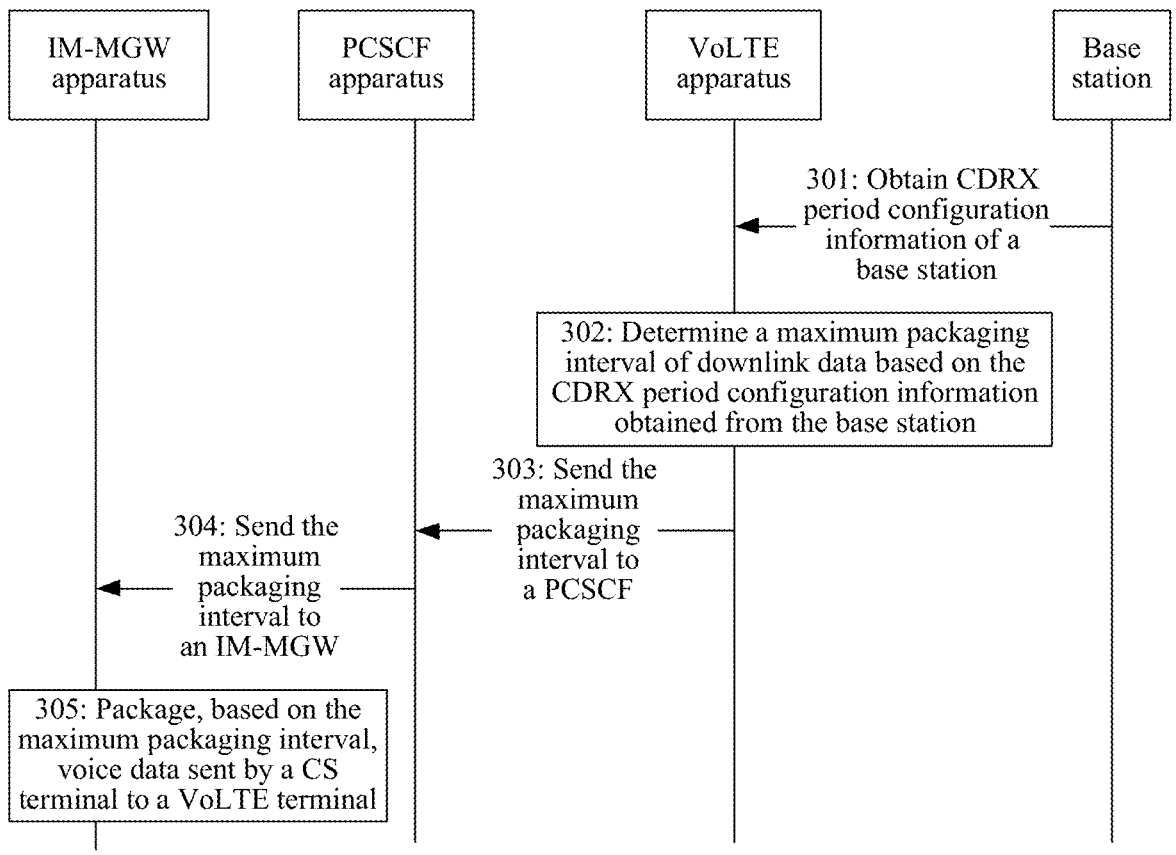
FIG. 3 is a flowchart of a method for negotiating a maximum packaging interval according to an embodiment of the present invention.

With reference to the system architecture shown in FIG. 1 and the VoLTE apparatus, the PCSCF apparatus, or the IM-MGW apparatus having the structure shown in FIG. 2, an embodiment of the present invention provides a method for negotiating a maximum packaging interval maxptime. The method may be applied to a scenario in which a CS apparatus performs voice communication with the VoLTE apparatus. Referring to FIG. 3, the method may include the following steps.

301: The VoLTE apparatus obtains CDRX period configuration information of a base station.

After obtaining the CDRX period configuration information sent by the base station, the VoLTE apparatus determines whether the base station configures a CDRX period. The CDRX period configuration information may include long CDRX period configuration information and/or short CDRX period configuration information. To be specific, the CDRX period configuration information may include whether a long CDRX period and/or a short CDRX period is configured, and values/a value of the configured long CDRX period and/or short CDRX period. A length of the long CDRX period is greater than a length of the short CDRX period. Parameter information, such as whether the long CDRX period is configured, the length of the long CDRX period, whether the short CDRX period is configured, and the length of the short CDRX period, is all configured by the base station (for example, an evolved Node B) in an LTE network and delivered to the VoLTE apparatus.

Specifically, the base station in the LTE network may generate the CDRX period configuration information when the VoLTE apparatus is registered, and delivers the CDRX period configuration information to the VoLTE apparatus after the VoLTE apparatus completes the registration; when the VoLTE apparatus is switched from an LTE network to another LTE network and the VoLTE apparatus is successfully registered with the new LTE network, the new LTE network generates the CDRX period configuration information, and delivers the CDRX period configuration information to the VoLTE apparatus after the VoLTE apparatus completes the registration.

Alternatively, in another implementation, before the step 301, the method may further include: receiving, by the base station, a CDRX period configuration information obtaining request sent by the VoLTE apparatus, and sending the CDRX period configuration information to the VoLTE apparatus, so that when determining the CDRX period based on the CDRX period configuration information after obtaining the CDRX period configuration information, the VoLTE apparatus may configure a maximum packaging interval maxptime of downlink data based on the CDRX period.

302: The VoLTE apparatus determines a maximum packaging interval maxptime of downlink data based on the CDRX period configuration information obtained from the base station. The maximum packaging interval maxptime is greater than or equal to a CDRX period and is less than or equal to maximum data packet duration supported by the VoLTE apparatus, and the maximum packaging interval maxptime is a positive integer multiple of a packaging interval ptime.

After obtaining the CDRX period configuration information from the base station, the VoLTE apparatus may determine, based on the CDRX period configuration information, whether the base station configures the CDRX period. If determining that the base station configures the CDRX period, the VoLTE apparatus may configure the maximum packaging interval maxptime of the downlink data based on the CDRX period configuration information. The maximum packaging interval maxptime of the downlink data means duration of a data packet after the IM-MGW apparatus performs RTP packaging when sending the downlink data to the VoLTE apparatus. Specifically, the maximum packaging interval maxptime determined by the VoLTE apparatus is greater than or equal to a CDRX period and is less than or equal to maximum data packet duration supported by the VoLTE apparatus, and the maximum packaging interval maxptime is the positive integer multiple of the packaging interval ptime.

In a VoLTE network, data is transmitted by using a single data frame as a unit. To be specific, one data frame is a data packet, the packaging interval ptime is duration of one data frame in the VoLTE network, for example, may be specifically 20 ms. When the VoLTE apparatus performs the voice communication with the CS apparatus, the IM-MGW apparatus needs to perform, based on the maximum packaging interval maxptime, RTP packaging on voice data sent by the CS apparatus. Specifically, the IM-MGW apparatus encapsulates several data frames into an RTP data packet. Therefore, the maximum packaging interval maxptime should be a positive integer multiple of the duration of one data frame, that is, the positive multiple of the packaging interval ptime.

Moreover, the maximum packaging interval maxptime should not exceed the maximum data packet duration supported by the VoLTE apparatus, otherwise the VoLTE apparatus cannot normally receive or process the data packet forwarded by the IM-MGW apparatus. Therefore, when the maximum packaging interval maxptime is less than or equal to the maximum data packet duration supported by the VoLTE apparatus, the data packet packaged based on the maximum packaging interval maxptime may be within a range within which the VoLTE apparatus may perform processing.

303: The VoLTE apparatus sends the maximum packaging interval maxptime to the PCSCF apparatus in an IMS core network.

304: After receiving the maximum packaging interval maxptime sent by the VoLTE apparatus, the PCSCF apparatus sends the maximum packaging interval maxptime to the IM-MGW apparatus.

305: After receiving the maximum packaging interval maxptime sent by the PCSCF apparatus, the IM-MGW apparatus packages, based on the maximum packaging interval maxptime, voice data sent by the CS apparatus to the VoLTE apparatus.

In the steps 303 to 305, the VoLTE apparatus sends the maximum packaging interval maxptime to the PCSCF apparatus in the IMS core network; after receiving the maximum packaging interval maxptime, the PCSCF apparatus forwards the maximum packaging interval maxptime to the IM-MGW apparatus; and the IM-MGW apparatus performs RTP packaging on the voice data based on information of the maximum packaging interval maxptime, converts the voice data into a data format needed by the VoLTE apparatus, and sends the packaged voice data packet to the VoLTE apparatus, so that the CS apparatus performs the voice communication with the VoLTE apparatus.

It should be noted that, in the prior art, when the maximum packaging interval maxptime is less than the CDRX period, a data packet interval is less than the CDRX period. The VoLTE apparatus is frequently woken up within the CDRX period, to perform data processing, resulting in an increase in power consumption of the VoLTE apparatus. However, in this embodiment of the present invention, the maximum packaging interval maxptime configured by the VoLTE apparatus not only is less than or equal to the maximum data packet duration supported by the VoLTE apparatus and is the positive multiple of the packaging interval ptime, but also is greater than or equal to the CDRX period, to avoid a problem of an increase in the power consumption that is caused by that the VoLTE apparatus is frequently woken up within the CDRX period because the maximum packaging interval maxptime is less than the CDRX period, that is, a data packet interval at a connected mode data transmission stage is less than the CDRX period.

Figure 4:
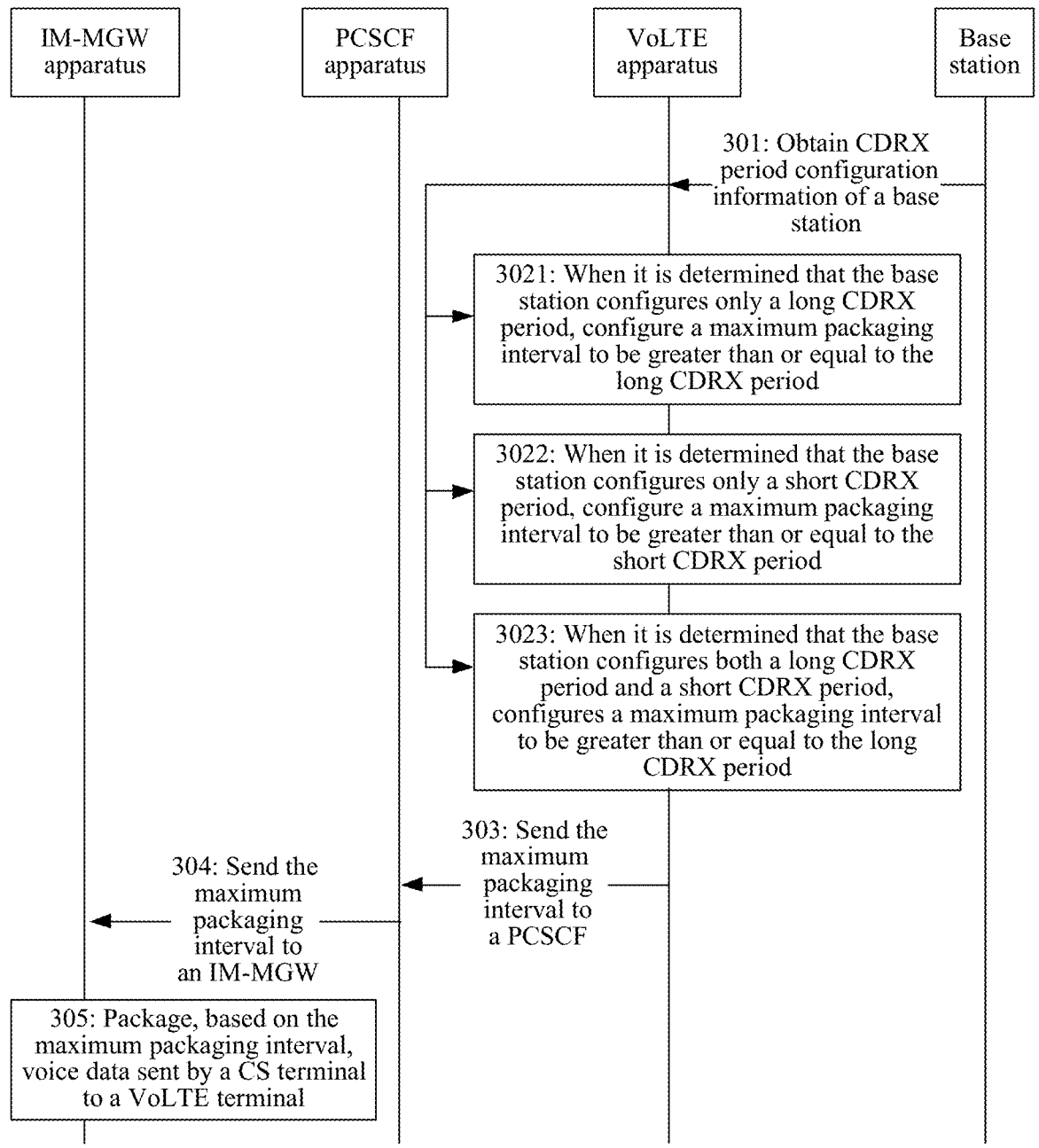
FIG. 4 is a flowchart of another method for negotiating a maximum packaging interval according to an embodiment of the present invention.

Specifically, referring to FIG. 4, in step 302, that VoLTE apparatus configures the maximum packaging interval maxptime of the downlink data based on the CDRX period configuration information, and the maximum packaging interval maxptime is greater than or equal to the CDRX period may include the following steps.

3021: When the VoLTE apparatus determines, based on the CDRX period configuration information obtained from the base station, that the base station configures the CDRX period, and configures only a long CDRX period, the VoLTE apparatus configures the maximum packaging interval maxptime to be greater than or equal to the long CDRX period.

3022: When the VoLTE apparatus determines, based on the CDRX period configuration information obtained from the base station, that the base station configures the CDRX period, and configures only a short CDRX period, the VoLTE apparatus configures the maximum packaging interval maxptime to be greater than or equal to the short CDRX period.

3023: When the VoLTE apparatus determines, based on the CDRX period configuration information obtained from the base station, that the base station configures the CDRX period, and configures both a long CDRX period and a short CDRX period, the VoLTE apparatus configures the maximum packaging interval maxptime to be greater than or equal to the long CDRX period. The long CDRX period is greater than the short CDRX period.

For example, if the packaging interval ptime is 20 ms, and the maximum data packet duration supported by the VoLTE apparatus is 12 packaging intervals ptime, namely, 240 ms.

When the VoLTE apparatus determines, based on the CDRX period configuration information obtained from the base station, that the base station configures the CDRX period and configures only the long CDRX period, for example, the long CDRX period is 60 ms, and then the VoLTE apparatus may configure the maximum packaging interval maxptime to be greater than or equal to the long CDRX period, that is, to be greater than or equal to 60 ms, to be less than or equal to 240 ms, and to be an integer multiple of 20 ms. To be specific, the maximum packaging interval maxptime may be any one of 60 ms, 80 ms, . . . , and 240 ms.

When the VoLTE apparatus determines, based on the CDRX period configuration information obtained from the base station, that the base station configures the CDRX period and configures only the short CDRX period, for example, the short CDRX period is 40 ms, and then the VoLTE apparatus may configure the maximum packaging interval maxptime to be greater than or equal to the short CDRX period, that is, to be greater than or equal to 40 ms, to be less than or equal to 240 ms, and to be an integer multiple of 20 ms. To be specific, the maximum packaging interval maxptime may be any one of 40 ms, 60 ms, 80 ms, . . . , and 240 ms.

When the VoLTE apparatus determines, based on the CDRX period configuration information obtained from the base station, that the base station configures the CDRX period and configures both the long CDRX period and the short CDRX period, for example, the long CDRX period is 60 ms, and the short CDRX period is 40 ms, and then the VoLTE apparatus may configure the maximum packaging interval maxptime to be greater than or equal to the long CDRX period, that is, to be greater than or equal to 60 ms, to be less than or equal to 240 ms, and to be an integer multiple of 20 ms. To be specific, the maximum packaging interval maxptime may be any one of 60 ms, 80 ms, . . . , and 240 ms.

In this way, the maximum packaging interval maxptime configured by the VoLTE apparatus is greater than or equal to the CDRX period (regardless of the long CDRX period or the short CDRX period) configured by the network side, to avoid a problem of an increase in power consumption that is resulted from that the VoLTE apparatus is frequently woken up within the CDRX period.

Further, based on that the maximum packaging interval maxptime is greater than or equal to the CDRX period and is less than or equal to the maximum data packet duration supported by the VoLTE apparatus, and the maximum packaging interval maxptime is the positive integer multiple of the packaging interval ptime, the maximum packaging interval maxptime may be a value that is among positive integer multiples of the packaging interval ptime and that has a minimum difference from the CDRX period.

For example, if the packaging interval ptime is 20 ms, and the maximum data packet duration supported by the VoLTE apparatus is 12 packaging intervals ptime, namely, 240 ms.

When the VoLTE apparatus determines, based on the CDRX period configuration information obtained from the base station, that the base station configures the CDRX period and configures only the long CDRX period, for example, the long CDRX period is 60 ms, and then in 60 ms, 80 ms, . . . , and 240 ms that are greater than or equal to the long CDRX period, a value having the minimum difference from the long CDRX period is 60 ms; and the VoLTE apparatus configures the maximum packaging interval maxptime to be the value that is among the positive integer multiples of the packaging interval ptime and that has the minimum difference from the long CDRX period. To be specific, the VoLTE apparatus may configure the maximum packaging interval maxptime to be 60 ms.

When the VoLTE apparatus determines, based on the CDRX period configuration information obtained from the base station, that the base station configures the CDRX period and configures only the short CDRX period, for example, the short CDRX period is 40 ms, and then in 40 ms, 60 ms, 80 ms, . . . , and 240 ms that are greater than or equal to the short CDRX period, a value having the minimum difference from the short CDRX period is 40 ms; and the VoLTE apparatus configures the maximum packaging interval maxptime to be the value that is among the positive integer multiples of the packaging interval ptime and that has the minimum difference from the short CDRX period. To be specific, the VoLTE apparatus may configure the maximum packaging interval maxptime to be 40 ms.

When the VoLTE apparatus determines, based on the CDRX period configuration information obtained from the base station, that the base station configures the CDRX period and configures both the long CDRX period and the short CDRX period, for example, the long CDRX period is 60 ms and the short CDRX period is 40 ms, and then in 60 ms, 80 ms, . . . , and 240 ms that are greater than or equal to the long CDRX period, a value having the minimum difference from the long CDRX period is 60 ms; and the VoLTE apparatus configures the maximum packaging interval maxptime to be the value that is among the positive integer multiples of the packaging interval ptime and that has the minimum difference from the long CDRX period. To be specific, the VoLTE apparatus may configure the maximum packaging interval maxptime to be 60 ms.

In this way, the maximum packaging interval maxptime may be a smallest value under a premise that the maximum packaging interval maxptime is greater than or equal to the CDRX period, to minimize a quantity of data frames in the data packet based on reducing power consumption of the VoLTE apparatus, thereby reducing a volume of lost data when the packet loss rate is unchanged. Especially in a moving state, such as on an expressway or on a high speed rail, or in an area covered by weak signals, such as in an underground garage or in a room, the method is used to determine the maximum packaging interval maxptime, so that the quantity of lost data is minimized while power consumption of the VoLTE apparatus is reduced, thereby improving de-jitter performance of a voice packet and improving voice quality.

In another possible implementation, based on that the maximum packaging interval maxptime is greater than or equal to the CDRX period and is less than or equal to the maximum data packet duration supported by the VoLTE apparatus, and the maximum packaging interval maxptime is the positive integer multiple of the packaging interval ptime, the maximum packaging interval maxptime may alternatively be less than or equal to a preset threshold, and the preset threshold may be less than or equal to the maximum data packet duration supported by the VoLTE apparatus.

The preset threshold may be set based on an actual requirement. For example, the preset threshold is 120 ms, and the packaging interval ptime is 20 ms.

When the VoLTE apparatus determines, based on the CDRX period configuration information obtained from the base station, that the base station configures the CDRX period and configures only the long CDRX period, for example, the long CDRX period is 60 ms, and then the VoLTE apparatus may configure the maximum packaging interval maxptime to be greater than or equal to the long CDRX period, that is, to be greater than or equal to 60 ms, to be less than or equal to the preset threshold, that is, to be less than or equal to 120 ms, and to be an integer multiple of 20 ms. To be specific, the maximum packaging interval maxptime may be any one of 60 ms, 80 ms, 100 ms, or 120 ms.

When the VoLTE apparatus determines, based on the CDRX period configuration information obtained from the base station, that the base station configures the CDRX period and configures only the short CDRX period, for example, the short CDRX period is 40 ms, and then the VoLTE apparatus may configure the maximum packaging interval maxptime to be greater than or equal to the short CDRX period, that is, to be greater than or equal to 40 ms, to be less than or equal to the preset threshold, that is, to be less than or equal to 120 ms, and to be an integer multiple of 20 ms. To be specific, the maximum packaging interval maxptime may be any one of 40 ms, 60 ms, 80 ms, 100 ms, or 120 ms.

When the VoLTE apparatus determines, based on the CDRX period configuration information obtained from the base station, that the base station configures the CDRX period and configures both the long CDRX period and the short CDRX period, for example, the long CDRX period is 60 ms, and the short CDRX period is 40 ms, and then the VoLTE apparatus may configure the maximum packaging interval maxptime to be greater than or equal to the long CDRX period, that is, to be greater than or equal to 60 ms, to be less than or equal to the preset threshold, that is, to be less than or equal to 120 ms, and to be an integer multiple of 20 ms. To be specific, the maximum packaging interval maxptime may be any one of 60 ms, 80 ms, 100 ms, or 120 ms.

It should be noted that, in the prior art, the maximum packaging interval maxptime is equal to supported maximum data packet duration. Compared with the prior art, because the preset threshold in this embodiment of the present invention is less than or equal to the maximum data packet duration supported by the VoLTE apparatus, a value of the maximum packaging interval maxptime less than or equal to the preset threshold is smaller. A quantity of data frames in the data packet packaged based on the maximum packaging interval maxptime is also smaller. When the packet loss rate is unchanged, a volume of lost data is also smaller, thereby improving de-jitter performance of the voice packet and improving voice quality.

Figure 5:
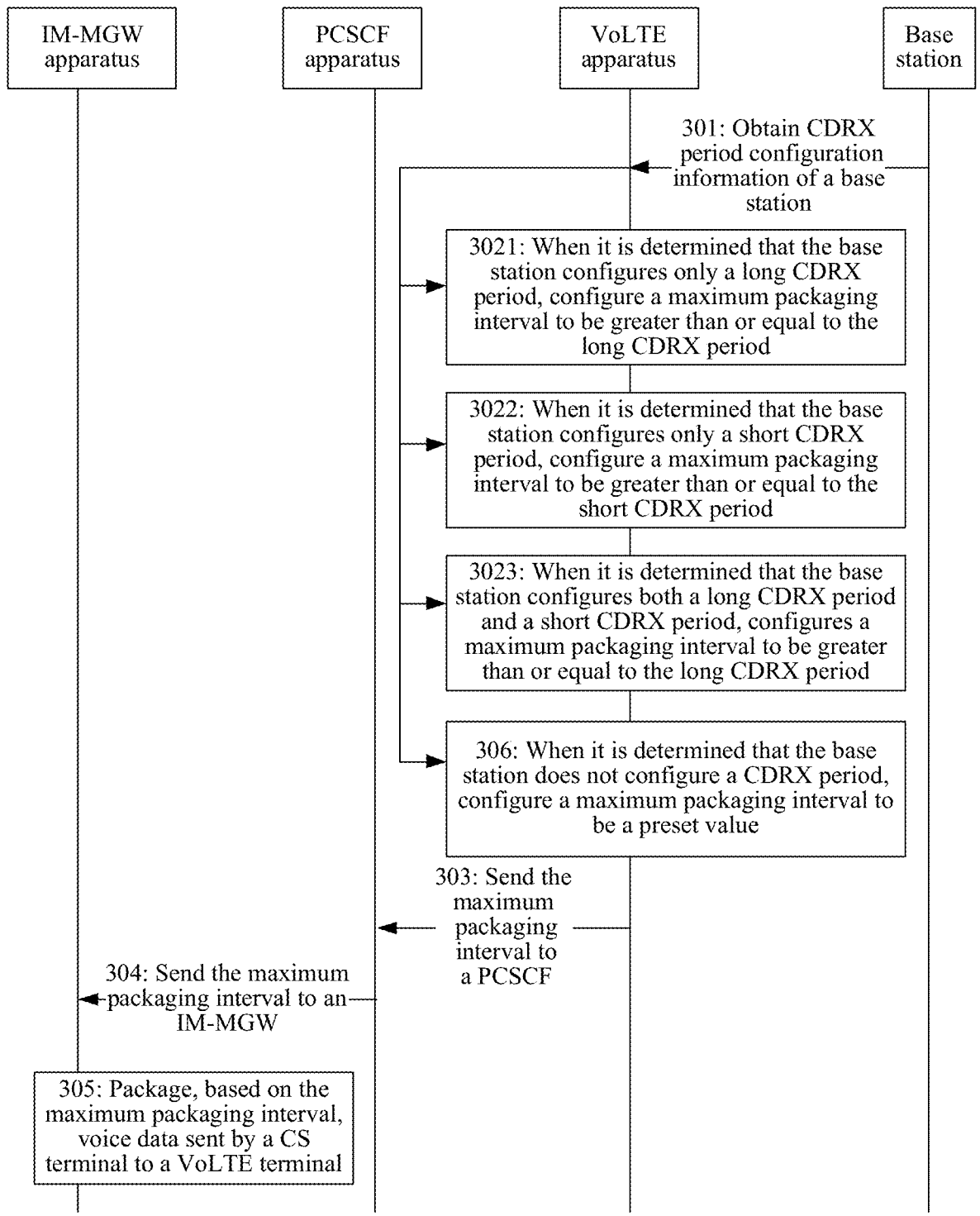
FIG. 5 is a flowchart of another method for negotiating a maximum packaging interval according to an embodiment of the present invention.

Further, referring to FIG. 5, the method provided in this embodiment of the present invention may further include the following step:

306: When determining, based on the CDRX period configuration information obtained from the base station, that the base station does not configure the CDRX period, the VoLTE apparatus configures the maximum packaging interval maxptime to be a preset value. The preset value is less than or equal to the maximum data packet duration supported by the VoLTE apparatus, and is the positive integer multiple of the packaging interval ptime.

When determining, based on the CDRX period configuration information obtained from the base station, that the base station does not configure the CDRX period, the VoLTE apparatus may configure the maximum packaging interval maxptime to be the preset value. The preset value is less than or equal to the maximum data packet duration supported by the VoLTE apparatus, and is the positive integer multiple of the packaging interval ptime. Because the preset value is less than or equal to the maximum data packet duration supported by the VoLTE apparatus, when the maximum packaging interval maxptime is configured to be the preset value, duration of the data packet packaged based on the maximum packaging interval maxptime may be within a range within which the VoLTE apparatus may perform processing.

Compared with that the maximum packaging interval maxptime is equal to the supported maximum data packet duration in the prior art, in this embodiment of the present invention, the VoLTE apparatus sets the maximum packaging interval maxptime to the preset value. A value of the maximum packaging interval maxptime may be configured based on an actual design requirement, so that a quantity of data frames in the data packet packaged based on the maximum packaging interval maxptime is smaller. Therefore, when a packet loss rate is unchanged, a volume of lost data may be appropriately reduced. Specifically, the preset value may be set based on an actual requirement. For example, when the CDRX period is not configured, the maximum packaging interval maxptime may be a preset value 40 ms.

The method for negotiating a maximum packaging interval maxptime provided in foregoing embodiment of the present invention may be applied to the scenario in which the VoLTE apparatus performs voice communication with the CS apparatus. After obtaining the CDRX period configuration information of the base station, the VoLTE apparatus configures the maximum packaging interval maxptime based on the CDRX period configuration information, so that the maximum packaging interval maxptime is greater than or equal to the CDRX period, to avoid a problem of an increase in power consumption that is caused by that the VoLTE apparatus is frequently woken up within the CDRX period because the maximum packaging interval maxptime is less than the CDRX period, that is, a data packet interval at a connected mode data transmission stage is less than the CDRX period. In addition, to ensure normal processing by the VoLTE apparatus, the maximum packaging interval maxptime is less than or equal to the maximum data packet duration supported by the VoLTE apparatus, and the maximum packaging interval maxptime is the positive integer multiple of the packaging interval ptime.

Figure 6:
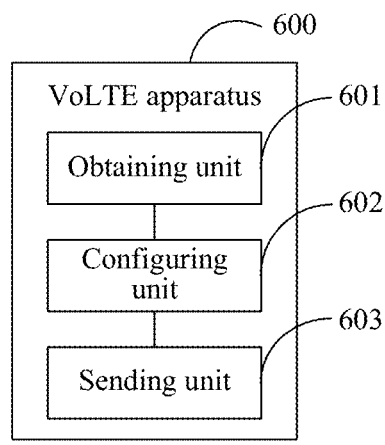
FIG. 6 is a schematic structural diagram of a VoLTE apparatus according to an embodiment of the present invention.

As shown in FIG. 6, an embodiment of the present invention further provides a schematic structural diagram of a VoLTE apparatus. The apparatus 600 may include an obtaining unit 601, a configuring unit 602, and a sending unit 603. The obtaining unit 601 may be configured to obtain CDRX period configuration information of a base station.

The configuring unit 602 may be configured to configure a maximum packaging interval maxptime of downlink data based on the CDRX period configuration information. The maximum packaging interval maxptime is greater than or equal to a CDRX period and is less than or equal to maximum data packet duration supported by the VoLTE apparatus, and the maximum packaging interval maxptime is a positive integer multiple of a packaging interval ptime. The sending unit 603 may be configured to send the maximum packaging interval maxptime to a proxy call session control function PCSCF apparatus in an Internet Protocol IP multimedia subsystem IMS core network.

Further, the configuring unit 602 may further be configured to perform steps performed by the VoLTE apparatus in FIG. 4 and FIG. 5, such as steps 3021, 3022, 3023, and 306. Details are not described in this embodiment of the present invention herein. In addition, the apparatus in FIG. 6 may be configured to perform any process performed by the VoLTE apparatus in the foregoing method processes.

Further, the apparatus in FIG. 6 is presented in a form of functional units. The "unit" herein may be an application-specific integrated circuit (Application-specific Integrated Circuit, ASIC), a circuit, a processor and a memory that execute one or more software or firmware programs, an integrated logic circuit, and/or another device providing the foregoing functions. In a simple embodiment, persons skilled in the art may figure out that the apparatus in FIG. 6 may be in a form shown in FIG. 2. The units may be implemented by using the processor and the memory in FIG. 2.

Figure 7:
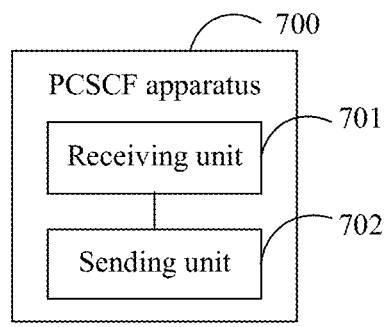
FIG. 7 is a schematic structural diagram of a PCSCF apparatus according to an embodiment of the present invention.

As shown in FIG. 7, an embodiment of the present invention further provides a schematic structural diagram of a PCSCF apparatus. The apparatus 700 may include a receiving unit 701 and a sending unit 702. The receiving unit 701 may be configured to receive a maximum packaging interval maxptime sent by a VoLTE apparatus. The maximum packaging interval maxptime is greater than or equal to a CDRX period and is less than or equal to maximum data packet duration supported by the VoLTE apparatus, and the maximum packaging interval maxptime is a positive integer multiple of a packaging interval ptime. The sending unit 702 may be configured to send the maximum packaging interval maxptime to an IM-MGW apparatus. In addition, the apparatus in FIG. 7 may be configured to perform any process performed by the PCSCF apparatus in the foregoing method processes.

Further, the apparatus in FIG. 7 is presented in a form of functional units. The "unit" herein may be an application-specific integrated circuit ASIC, a circuit, a processor and a memory that execute one or more software or firmware programs, an integrated logic circuit, and/or another device providing the foregoing functions. In a simple embodiment, persons skilled in the art may figure out that the apparatus in FIG. 7 may be in a form shown in FIG. 2. The units may be implemented by using the processor and the memory in FIG. 2.

Figure 8:
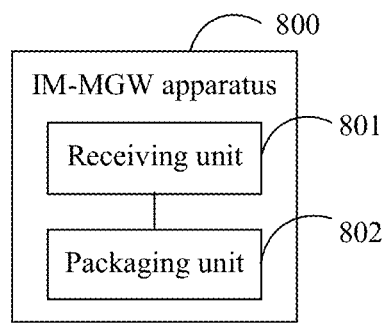
FIG. 8 is a schematic structural diagram of an IM-MGW apparatus according to an embodiment of the present invention.

As shown in FIG. 8, an embodiment of the present invention further provides a schematic structural diagram of an IM-MGW apparatus. The apparatus 800 may include a receiving unit 801 and a packaging unit 802. The receiving unit 801 may be configured to receive a maximum packaging interval maxptime sent by a PCSCF apparatus. The maximum packaging interval maxptime is greater than or equal to a CDRX period and is less than or equal to maximum data packet duration supported by a VoLTE apparatus, and the maximum packaging interval maxptime is a positive integer multiple of a packaging interval ptime.

The packaging unit 802 may be configured to package, based on the maximum packaging interval maxptime, voice data sent by a circuit switched CS apparatus to the VoLTE apparatus. In addition, the apparatus in FIG. 8 may be configured to perform any process performed by the IM-MGW apparatus in the foregoing method processes.

Further, the apparatus in FIG. 8 is presented in a form of functional units. The "unit" herein may be an application-specific integrated circuit ASIC, a circuit, a processor and a memory that execute one or more software or firmware programs, an integrated logic circuit, and/or another device providing the foregoing functions. In a simple embodiment, persons skilled in the art may figure out that the apparatus in FIG. 8 may be in a form shown in FIG. 2. The units may be implemented by using the processor and the memory in FIG. 2.

An embodiment of the present invention further provides a computer storage medium, configured to store a computer software instruction that is used by the VoLTE apparatus shown in FIG. 6, the PCSCF apparatus shown in FIG. 7, or the IM-MGW apparatus shown in FIG. 8. The computer storage medium includes a program designed to perform the foregoing method embodiments.

An embodiment of the present invention further provides a communications system. Refer to FIG. 1 for a schematic diagram of a basic architecture of the system. The system may include the VoLTE apparatus shown in FIG. 2 or FIG. 6, the PCSCF apparatus shown in FIG. 2 or FIG. 7, the IM-MGW apparatus shown in FIG. 2 or FIG. 8, a base station, a CS apparatus, and the like. The apparatuses may perform processing processes in the method embodiments shown in FIG. 3 to FIG. 5.

In the several embodiments provided in this application, it should be understood that the disclosed device, method, and system may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

The foregoing integrated unit implemented in a form of a software functional unit may be stored in a non-volatile computer-readable storage medium. The software functional unit is stored in a non-volatile storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory RAM, a magnetic disk, or an optical disc.

Finally, it should be noted that: The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof. These modifications or replacements do not cause essences of corresponding technical solutions to depart from the scope of the technical solutions of the embodiments of the present invention.

What is claimed is:

1. A method, comprising:
sending, by a first user equipment (UE), first voice data to a first network apparatus;
packaging, by the first network apparatus, the first voice data into a first data packet based on a first maximum packaging interval (MPI);
sending, by the first network apparatus, the first data packet to a second network apparatus;
sending, by the second network apparatus, the first data packet to a second UE;
receiving, by the second UE, Connected Mode Discontinuous Reception (CDRX) period configuration information from a base station;
configuring, by the second UE, a second MPI based on a CDRX period configuration information, wherein the second MPI is greater than or equal to the CDRX period and is less than or equal to a maximum data packet duration supported by the second UE;
sending, by the second UE, the second MPI to the second network apparatus;
sending, by second network apparatus, the second MPI to the first network apparatus;
sending, by the first UE, second voice data to the first network apparatus;
packaging, by the first network apparatus, the second voice data into a second data packet based on the second MPI;
sending, by the first network apparatus, the second data packet to the second network apparatus; and
sending, by the second network apparatus, the second data packet to the second UE.

2. The method of claim 1, wherein the first UE is configured to support a Circuit Switched function, and wherein the second UE is configured to support a voice over long term evolution (VoLTE) function.

3. The method of claim 1, wherein the first MPI or the second MPI is a positive integer multiple of a packaging interval (ptime), and wherein the ptime is a duration of one data frame in a voice over long term evolution (VoLTE) network.

4. The method of claim 1, wherein packaging the first voice data into the first data packet comprises encapsulating, by the first network apparatus, the first voice data into a Real-time Transport Protocol (RTP) data packet base on the first MPI.

5. The method of claim 1, wherein the first network apparatus is Internet Protocol (IP) Multimedia Media Gateway (IM-MGW), and wherein the second network apparatus is Proxy Call Session Control Function (PCSCF).

6. The method of claim 1, wherein only a first CDRX period is configured based on the CDRX period configuration information, and wherein configuring the second MPI comprises configuring the second MPI to be greater than or equal to the first CDRX period.

7. The method of claim 1, wherein a first CDRX period and a second CDRX period are configured based on the CDRX period configuration information, wherein configuring the second MPI comprises configuring the second MPI to be greater than or equal to the first CDRX period, and wherein the first CDRX period is greater than the second CDRX period.

8. The method of claim 3, wherein a maxptime is a value among positive integer multiples of the ptime having a minimum difference from the CDRX period.

9. The method of claim 8, wherein the maxptime is less than or equal to a preset threshold, and wherein the preset threshold is less than or equal to a maximum data packet duration supported by a VoLTE apparatus.

10. A system, comprising:
a first user equipment (UE);
a second UE; and
a network apparatus coupled to the first UE and the second UE and configured to:
receive first voice data from the first UE;
package the first voice data into a first data packet based on a first maximum packaging interval (MPI);
send the first data packet to the second UE;
receive a second MPI from the second UE;
receive second voice data from the first UE;
package the second voice data into a second data packet based on the second MPI;
send the second data packet to the second UE, and
wherein the second UE is configured to:
receive Connected Mode Discontinuous Reception (CDRX) period configuration information from a base station;
configure the second MPI based on the CDRX period configuration information, wherein the second MPI is greater than or equal to a CDRX period and less than or equal to a maximum data packet duration supported by the second UE; and
send the second MPI to the first network apparatus.

11. The system of claim 10, wherein the second UE is configured to support a voice over long term evolution (VoLTE) function, and wherein the network apparatus is an Internet Protocol (IP) Multimedia Media Gateway (IM-MGW).

12. The system of claim 10, wherein the first MPI or the second MPI is a positive integer multiple of the packaging interval (ptime), and wherein the ptime is a duration of one data frame in a voice over long term evolution (VoLTE) network.

13. The system of claim 10, wherein in a manner of packaging the first voice data into the first data packet, the network apparatus is further configured to encapsulate the first voice data into a Real-time Transport Protocol (RTP) data packet based on the first MPI.

14. An apparatus, comprising:
at least one processor; and
at least one memory, the at least one memory comprising instructions that when executed by the at least one processor, cause the apparatus to:
receive a first voice data packet, wherein the first voice data packet is packaged by a first apparatus according to a first maximum packaging interval (MPI);
receive Connected Mode Discontinuous Reception (CDRX) period configuration information from a base station;
configure a second MPI based on the CDRX period configuration information, wherein the second MPI is greater than or equal to a CDRX period and less than or equal to a maximum data packet duration supported by a voice over long term evolution (VoLTE) apparatus;
send the second MPI to the first apparatus; and
receive a second voice data packet, wherein the second voice data packet is packaged by the first apparatus according to the second MPI.

15. The apparatus of claim 14, wherein the apparatus is configured to support a VoLTE function.

16. The apparatus of claim 14, wherein only a first CDRX period is configured based on the CDRX period configuration information, and wherein in a manner of configuring the second MPI, the instructions, when executed by the at least one processor, further cause the apparatus to configure the second MPI to be greater than or equal to the first CDRX period.

17. The apparatus of claim 14, wherein a first CDRX period and a second CDRX period are configured based on the CDRX period configuration information, wherein in a manner of configuring the second MPI based on the CDRX period configuration information, the instructions, when executed by the at least one processor, further cause the apparatus to configure the second MPI to be greater than or equal to the first CDRX period, and wherein the first CDRX period is greater than the second CDRX period.

18. The apparatus of claim 14, wherein the first MPI or the second MPI is a positive integer multiple of a packaging interval (ptime), and wherein the ptime is a duration of one data frame in a VoLTE network.

19. The apparatus of claim 18, wherein a maxptime is a value among positive integer multiples of the ptime having a minimum difference from the CDRX period.

20. The apparatus of claim 19, wherein the maxptime is less than or equal to a preset threshold, and wherein the preset threshold is less than or equal to a maximum data packet duration supported by the apparatus.

* * * * *